United States Patent
Martin et al.

(10) Patent No.: US 10,386,494 B2
(45) Date of Patent: Aug. 20, 2019

(54) METHOD FOR DETERMINING A WRONG SYNCHRONIZATION OF A RECEIVER WITH A SATELLITE, ASSOCIATED MODULE AND COMPUTER PROGRAM PRODUCT

(71) Applicant: THALES, Courbevoie (FR)

(72) Inventors: Nicolas Martin, Valence (FR); Yves Clauzel, Valence (FR)

(73) Assignee: THALES, Courbevoie (FR)

( * ) Notice: Subject to any disclaimer, the term of this patent is extended or adjusted under 35 U.S.C. 154(b) by 293 days.

(21) Appl. No.: 15/348,211

(22) Filed: Nov. 10, 2016

(65) Prior Publication Data

US 2017/0139051 A1 May 18, 2017

(30) Foreign Application Priority Data

Nov. 13, 2015 (FR) ...................... 15 02381

(51) Int. Cl.
  *G01S 19/21* (2010.01)
  *G01S 19/23* (2010.01)
  *G01S 19/30* (2010.01)

(52) U.S. Cl.
  CPC .............. *G01S 19/23* (2013.01); *G01S 19/21* (2013.01); *G01S 19/30* (2013.01)

(58) Field of Classification Search
  CPC .......... G01S 19/30; G01S 19/23; G01S 19/22; G01S 19/24; H04B 1/7073; H04B 1/7055
  See application file for complete search history.

(56) References Cited

U.S. PATENT DOCUMENTS

| 7,479,924 | B2 * | 1/2009 | Jia ........................... | G01S 19/24 342/357.63 |
| 7,680,178 | B2 * | 3/2010 | Raman .................... | G01S 19/21 342/357.46 |

(Continued)

FOREIGN PATENT DOCUMENTS

| CA | 2776084 A1 * | 11/2012 | ............. G01S 19/22 |
| EP | 2520949 A1 | 11/2012 | |
| EP | 2818893 A | 12/2014 | |

OTHER PUBLICATIONS

Van Dierendonck, A. J., et al., "Theory and Performance of Narrow Correlator Spacing in a GPS Receiver", NTM 1992—Proceedings of the 1992, National Technical Meeting of the Institute of Navigation, 8551 Rixlew Lane Suite 360Navigation, The Institute of Manassas, VA 20109, USA, 29 ianvier 1992 (Jan. 29, 1992), pp. 115-124.

(Continued)

*Primary Examiner* — Gregory C. Issing
(74) *Attorney, Agent, or Firm* — Troutman Sanders LLP

(57) ABSTRACT

This determination method for determining a wrong synchronization including the steps of determining an ad hoc correlator corresponding to the value of correlation between the received signal and the local signal, and determining N additional correlators corresponding to the values of correlation between the received signal and an offset signal, each offset signal including a spreading code that is offset in relation to the local spreading code, and determining a value for the amount of inconsistency between the frequency of the local carrier wave and the frequency of the local spreading code; if the value of inconsistency is higher than a predetermined threshold value of inconsistency, determining a wrong synchronization; otherwise, determining an indicator of wrong synchronization as a function of the correlators determined, comparing the indicator of wrong synchroniza- (Continued)

tion with at least one threshold value, determining a wrong synchronization based on the result of the comparison.

12 Claims, 3 Drawing Sheets

(56) References Cited

U.S. PATENT DOCUMENTS

| | | | |
|---|---|---|---|
| 8,170,085 B2* | 5/2012 | Han | G01S 19/22 375/150 |
| 2006/0039453 A1* | 2/2006 | Yamada | H04B 1/7085 375/150 |
| 2009/0046766 A1* | 2/2009 | Avellone | G01S 19/30 375/142 |
| 2011/0103432 A1* | 5/2011 | Tangudu | G01S 19/21 375/150 |
| 2011/0148708 A1* | 6/2011 | Myong, II | G01S 19/23 342/378 |
| 2012/0281735 A1 | 11/2012 | Martin et al. | |
| 2015/0022398 A1 | 1/2015 | Yamashina et al. | |

OTHER PUBLICATIONS

Rapport De Recherche Preliminaire (Preliminary Search Report) dated Jul. 20, 2016 issued in corresponding French Patent Application No. FR 1502381.

* cited by examiner

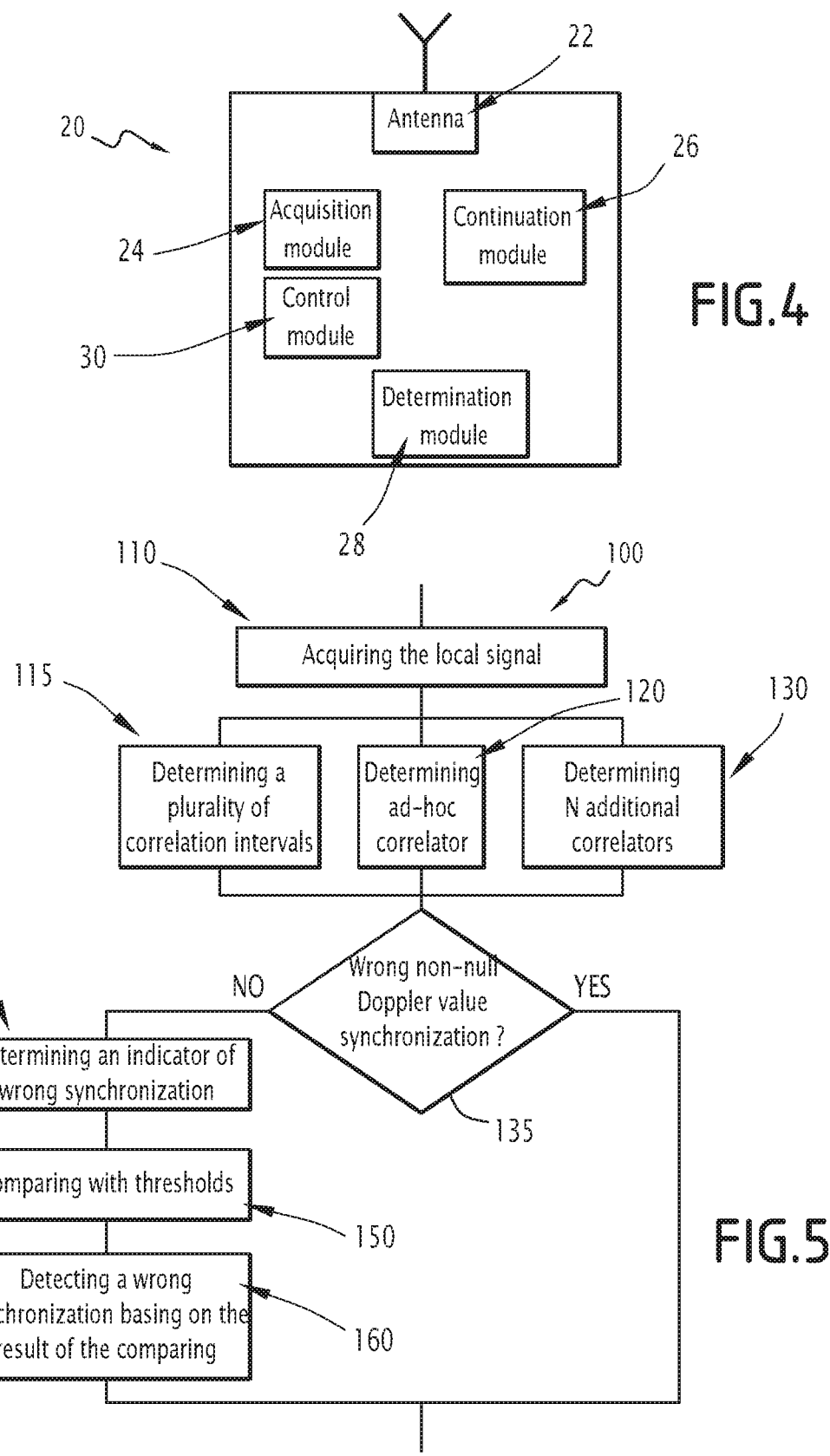

METHOD FOR DETERMINING A WRONG SYNCHRONIZATION OF A RECEIVER WITH A SATELLITE, ASSOCIATED MODULE AND COMPUTER PROGRAM PRODUCT

CROSS-REFERENCE TO RELATED APPLICATION

This patent application claims the benefit of French Patent Application No. 15 02381 filed on Nov. 13, 2015, which is hereby incorporated by reference.

FIELD OF THE INVENTION

The present invention relates to a synchronization determination method for determining a wrong synchronization of a receiver with a satellite, during an acquisition phase for acquiring a navigation signal originating from this satellite.

BACKGROUND

Such a satellite is part of a global satellite-aided positioning system also known by the English abbreviation GNSS (for "Global Navigation Satellite System").

In a general manner, a GNSS consists of a plurality of satellites that make it possible for a portable receiver to determine its position in a terrestrial reference frame, as well as its speed and time related information.

There are currently several GNSS based systems in existence, among which mention may be made in particular of the GPS, the GLONASS, or even the GALILEO which is expected to be put in operation in the near future.

The satellites of such a GNSS are capable of transmitting electromagnetic signals comprising in particular a navigation related information element.

Each navigation related information element generally includes data related to the transmission time for transmission by the satellite of the corresponding signal and to the current position of the satellite. In particular, the data related to the current position of the satellite generally contain the almanac giving a rough position of the satellite and the ephemerides giving the exact current position of the satellite.

The navigation related information element is carried by a carrier wave and modulated by a spreading code that is specific to each satellite. Thus, the signals are transmitted by the satellites using a spread spectrum technique.

The receiver is capable of receiving the signals transmitted by the satellites and of extracting the navigation related information element in order to in particular determine the distance to the satellite that has transmitted the corresponding signal. This distance, also known as pseudo-range, is determined by analyzing the propagation time for propagating the corresponding signal.

In order to determine its position, speed and the timing information, the receiver effectively deploys the digital treatment processing of the navigation related information elements from at least three different satellites.

In practice, in order to obtain a more precise position, the receiver needs navigation related information elements originating from at least four different satellites.

More precisely, in order to acquire the navigation related information from a given satellite, the receiver carries out two phases that process the signals coming from this said satellite.

During an initial phase, called the acquisition phase in the state of the art, the receiver generates a local signal containing in particular a local spreading code that presents the image of the spreading code of the satellite.

As initially the receiver does not know its position, the local signal is not synchronized with the signal received. This means in particular that the local signal is carrier frequency offset from the received signal by a value known as the Doppler value, and that the spreading code of the received signal is time lagged from the local spreading code by a value known as the lag value.

Then the receiver carries out a search for a peak of the correlations between the local signal and the received signal by trying various different Doppler values and lag values.

When a peak is detected, the receiver determines the Doppler and lag values corresponding to this peak and based on these values, launches a subsequent phase, called the continuation phase in the state of the art.

During the continuation phase, the receiver regularly updates the Doppler and lag values, and extracts the navigation related information element from the signal transmitted by the satellite using in particular the local spreading code and the Doppler and lag values determined.

At the end of the acquisition phase, it is considered that the receiver is synchronized with the satellite or even "locked in" to the satellite.

This means in particular that the receiver was able to find the Doppler and lag values related to this satellite so as to initiate the continuation phase.

It sometimes happens that the receiver synchronizes its local signal corresponding to the desired satellite on the received signal from another satellite, which leads to an erroneous measurement of distance, and therefore potentially to a wrong positioning.

In this event, it involves a wrong synchronization or a wrong "locking in".

This comes about for example when the correlation between the local signal and the signal received from the desired satellite gives less power than the correlation with the signal received from another satellite, due to a high deviation in received power.

There exist in the state of the art various different methods that make it possible to avoid such a wrong synchronization.

Thus, a method used in the conventional way, consists of checking and verifying the consistency between the satellite position calculated based on the ephemerides contained in the navigation related information element and the one calculated based on the almanac, which contains the identifiers of the satellites, in contrast to the ephemerides. The inconsistency between these values thus signifies a wrong synchronization.

However, this method is not completely satisfactory. In particular, it necessitates collecting all of the ephemerides contained in the navigation related information element which is a relatively long process. In practice, this could take up to two minutes.

It is then conceivable that this penalizes the operation of the receiver, particularly following a masking of the satellite, and does not provide ensuring a continuity of service.

The present invention aims at overcoming this drawback.

SUMMARY

To this end, the object of the invention relates to a synchronization determination method for determining a wrong synchronization of a receiver with a satellite, during an acquisition phase for acquiring a navigation signal originating from this satellite, the satellite being a part of a global satellite-aided positioning system, the signal comprising a navigation related information element that is modulated by a spreading code specific to this satellite and carried by a carrier wave;

during the acquisition phase, the receiver being capable of receiving the navigation signal transmitted by the satellite, of generating a local signal comprising a local carrier wave and a local spreading code, and of synchronizing the local signal with the received signal coming from the satellite in order to demodulate the received signal and of extracting therefrom the navigation related information element during a continuation phase following the acquisition phase;

the method being carried out after the acquisition phase during a phase of convergence and including the following steps:

in at least one correlation interval, determining an ad hoc correlator corresponding to the value of correlation between the received signal and the local signal;

in the or each correlation interval, determining N additional correlators corresponding to the values of correlation between the received signal and an offset signal, each offset signal including the local carrier wave and a spreading code that is offset in relation to the local spreading code by an offset value equal to a whole number of reference units, with the number N being a natural number;

determining a value for the inconsistency between the frequency of the local carrier wave and the frequency of the local spreading code, if the value of inconsistency is higher than a predetermined threshold value of inconsistency, determining a wrong synchronization, and in the contrary case:

determining an indicator of wrong synchronization as a function of the correlators determined;

comparing the indicator of wrong synchronization with at least one threshold value;

determining a wrong synchronization based on the result of the comparison of the indicator of wrong synchronization with the at least one threshold value.

According to other beneficial aspects of the invention, the determination method includes one or more of the following characteristic features, taken into consideration in isolation or in accordance with all technically possible combinations:

the reference unit is a chip;

each offset value is selected based on the local spreading code;

the indicator of wrong synchronization is the ratio of a detector determined as a function of the or each ad hoc correlator and the additional correlators, over a reference power determined as a function only of the or each ad hoc correlator.

the determination of the detector includes the calculation of a weighted sum of the additional correlators with predetermined weighting coefficients;

the weighting coefficients correspond to the amplitudes of the normalized autocorrelation function of the local spreading code, at the points that correspond to the offset values, the normalised autocorrelation function amounting to 1 at a point of reference;

the local spreading code is a Gold code;

each offset value is chosen to be equal to the value corresponding to a secondary peak of the autocorrelation function of the local spreading code;

during the comparison step, the indicator of wrong synchronization is compared with a low threshold value and with a high threshold value;

during the determination step, a wrong synchronization is determined when the indicator of wrong synchronization is lower than the low threshold value or higher than the high threshold value;

when the number N is equal to four, the low threshold value is roughly equal to 0.01 and the high threshold value is roughly equal to 0.03;

the synchronization of the local signal with the received signal comprising the determination of a value of the time lag of the spreading code of the received signal relative to that of the local signal and of a value of the frequency offset of the carrier wave of the received signal relative to that of the local signal.

The object of the invention also relates to a computer program product comprising software instructions which, when run by an IT equipment unit, carries out a method such as the one defined here above.

The object of the invention is also related to a determination module for determining a wrong synchronization of a receiver with a satellite during an acquisition phase for acquiring a navigation signal originating from this said satellite, the satellite being a part of a global satellite-aided positioning system, the signal comprising a navigation related information element that is modulated by a spreading code specific to this satellite and is carried by a carrier wave;

during the acquisition phase, the receiver being capable of receiving the navigation signal transmitted by the satellite, of generating a local signal comprising a local carrier wave and a local spreading code, and of synchronizing the local signal with the signal received from the satellite in order to demodulate the received signal and extracting therefrom the navigation related information element during a continuation phase following the acquisition phase;

the determination module being capable of:

in at least one correlation interval, determining an ad hoc correlator corresponding to the value of correlation between the received signal and the local signal;

in the or each correlation interval, determining N additional correlators corresponding to the values of correlation between the received signal and an offset signal, each offset signal including the local carrier wave and a spreading code that is offset in relation to the local spreading code by an offset value equal to an whole number of reference units, the number N being a natural number;

determining a value for the inconsistency between the frequency of the local carrier wave and the frequency of the local spreading code, if the value of inconsistency is above a predetermined threshold value of inconsistency, determining a wrong synchronization, in the contrary case:

determining an indicator of wrong synchronization as a function of the correlators determined;

comparing the indicator of wrong synchronization with at least one threshold value;

determining a wrong synchronization based on the result of the comparison of the indicator of wrong synchronization with the at least one threshold value.

BRIEF DESCRIPTION OF THE DRAWINGS

These characteristic features and advantages of the invention will become apparent upon reading the description that follows, given only by way of non limiting example, and made in reference to the drawings attached herewith, in which:

FIG. 4 is a detailed view of the determination module shown in FIG. 1;

FIG. 5 is a flowchart of a determination method implemented by the determination module shown in FIG. 4.

DETAILED DESCRIPTION

In the following sections of the description, the term "substantially equal to" is understood to refer to a relationship of equality to within plus or minus 10%.

Figure 1:
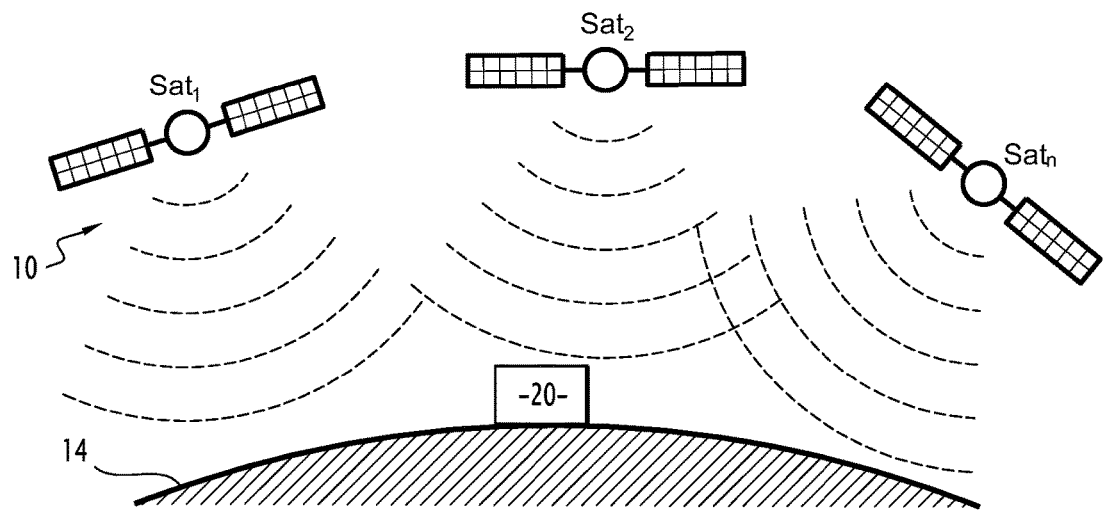
FIG. 1 is a schematic view of a global satellite-aided positioning system and a receiver, the receiver including a determination module for determining a wrong synchronization according to the invention.

In FIG. 1, it is indeed represented a global satellite positioning system 10 of the GNSS (for the English term "Global Navigation Satellite System") type.

With reference to this FIG. 1, the positioning system 10 comprises a plurality of satellites $Sat_n$ arranged in different orbits around the Earth for which the positioning system 10 is implemented.

For example, the total number of satellites $Sat_n$ is equal to 30.

The index n corresponds to an identifier of each satellite $Sat_n$ and varies for example between 1 and 30.

Each satellite $Sat_n$ is capable of transmitting electromagnetic signals S to a part of the Earth's surface 14 over which it is travelling.

In particular, the satellites $Sat_n$ are arranged so that at least three satellites $Sat_n$ are capable of transmitting electromagnetic navigation signals S to substantially each point of the Earth's surface 14.

The current position of each satellite $Sat_n$ is characterized by the ephemerides relating to this satellite or by the almanac thereof.

As it is known per se, the ephemerides provide the means to determine the exact position of the satellite $Sat_n$ while the almanac provides a rough position.

Each signal S transmitted by each of the satellites $Sat_n$ includes a navigation related information element.

In particular, such a signal S includes a navigation related information element modulated by a spreading code $C_n(\phi_c)$ specific to the satellite $Sat_n$ that has transmitted this signal.

The modulated navigation related information element is carried by a carrier wave $\exp(-j\phi_p)$ in accordance with a technique known per se.

Each navigation related information element includes in particular the time of transmission of the corresponding signal, the ephemerides, and the almanac of the satellite $Sat_n$ at the time instant of transmission of the signal S.

Each spreading code $C_n(\phi_c)$ presents a pseudorandom type binary code, known also in the state of the art under the abbreviation PRN (for the English term "Pseudo Random Noise").

Each spreading code $C_n(\phi_c)$ is a periodic code with a code period denoted by $L_c$ and expressed as a whole number of reference units.

The reference unit for example is a chip whose duration is denoted by $T_{chip}$ and is expressed in seconds.

The term "chip" is used to refer to a reference unit corresponding to a slot of a pseudorandom type code.

Each spreading code $C_n(\phi_c)$ is characterized by its autocorrelation function $R_{n,n}$ determined by the following formula:

$$R_{n,n}(\tau) = \frac{1}{L_c} \int_0^{L_c} C_n(u) C_n(u+\tau) du.$$

Notably, in the point $\tau=0$, referred to as the reference point, the autocorrelation function $R_{n,n}$ takes its maximum value $V_{max}$. For $\tau \leq -T_{chip}$ and $\tau \geq T_{chip}$, the autocorrelation function $R_{n,n}$ takes very small V values with respect to $V_{max}$, that is to say, $V \ll V_{max}$.

Figure 2:
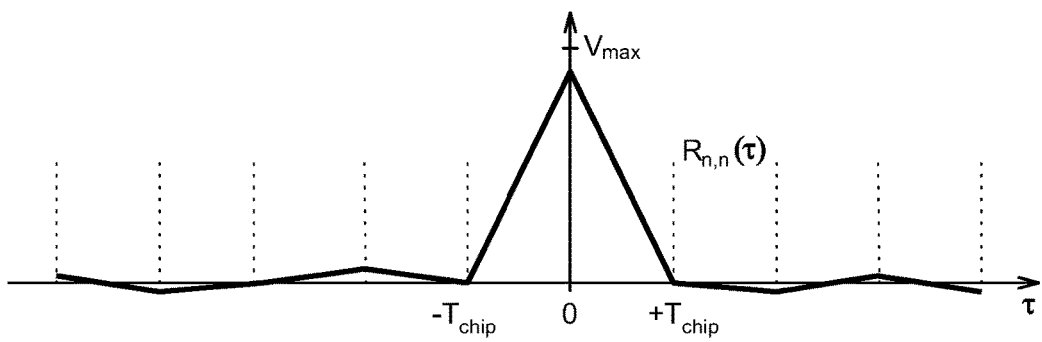
FIG. 2 is a schematic view of an autocorrelation function used during the operation of the system shown in FIG. 1.

An example of such an autocorrelation function $R_{n,n}$ is illustrated schematically in FIG. 2.

The spreading codes $C_n(\phi_c)$ corresponding to the various different satellites $Sat_n$, are quasi-perpendicular. In other words, the inter-correlation function $R_{n,p}$ between each couple of different spreading codes $C_n(\phi_c)$ and $C_i(\phi_c)$ takes negligible V values with respect to $V_{max}$, with the inter-correlation function $R_{n,p}$ being determined by the following formula:

$$R_{n,p}(\tau) = \frac{1}{L_c} \int_0^{L_c} C_n(u) C_p(u+\tau) du.$$

Figure 3:
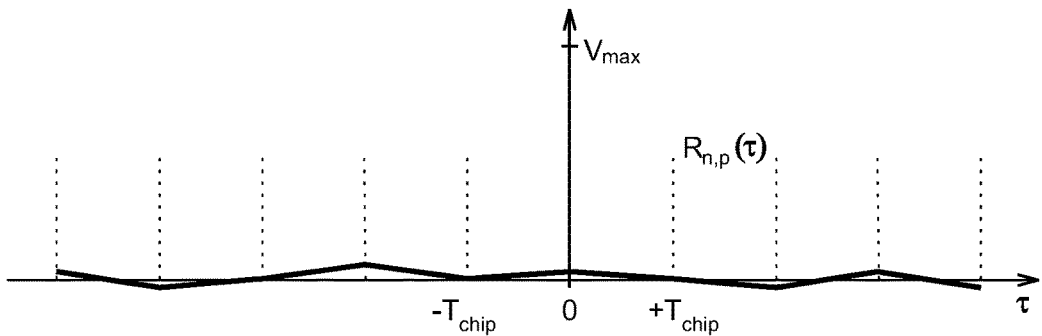
FIG. 3 is a schematic view of an inter-correlation function used during the operation of the system shown in FIG. 1.

An example of such an inter-correlation function $R_{n,p}$ is illustrated schematically in FIG. 3.

Each spreading code $C_n(\phi_c)$ provides the ability to modulate the navigation related information element transmitted by the satellite $Sat_n$.

During the reception of the signals transmitted from the satellites $Sat_n$, these signals are able to be demodulated by using the corresponding spreading codes $C_n(\phi_c)$.

According to the example of embodiment described here below, the positioning system 10 is the GPS (from the English term "Global Positioning System").

Of course, other examples of embodiment are also possible.

According to the exemplary embodiment described, the spreading codes $C_n(\phi_c)$ are Gold codes.

As known per se, the autocorrelation function $R_{n,n}$ of each Gold code includes a main peak corresponding to its global extremum, a plurality of secondary peaks corresponding to its local extrema other than the global extremum and constant sections.

Thus, in the main peak, the normalised autocorrelation function $R_{n,n}$ takes its maximal value equal to 1. In the secondary peaks, the autocorrelation function $R_{n,n}$ takes the value which is equal either to 63/1023 or to −65/1023. In the constant sections, the autocorrelation function $R_{n,n}$ takes the value equal to −1/1023.

The inter-correlation function of each couple of different Gold codes includes a plurality of secondary peaks corresponding to its extrema and constant sections.

Thus, in the secondary peaks, the normalised inter-correlation function $R_{n,p}$ takes the value which is equal either to 63/1023 or to −65/1023. In constant sections, the inter-correlation function takes the value equal to −1/1023.

The signals S transmitted at least by some of the satellites $Sat_n$ are received by a receiver 20.

For example, the receiver 20 is a portable electronic device.

For example, the receiver 20 is able to move over the Earth's surface 14 or in the proximity of the latter with a variable speed.

The receiver 20 is capable of receiving the signals S originating from the satellites $Sat_n$, and of extracting from these signals S the navigation related information element so as to deduce its current position, its current speed and the time as this will be explained later.

The receiver 20 is illustrated in greater detail in FIG. 4.

Thus, in reference to this FIG. 4, the receiver 20 comprises an antenna 22, an acquisition module 24, a continuation module 26, a determination module 28 according to the invention, a control module 30 and material resources.

The modules 24, 26, 28 and 30 are present for example in the form of software applications that are operationally deployed by the equipment/material resources provided for this purpose, such as a processor, a RAM (Random Access Memory), a ROM (Read Only Memory), etc. The equipment/material resources are for example powered by a battery.

In particular, the ROM of the receiver 20 is capable of storing the images of the spreading codes $C_N(\phi_c)$ of each satellite $Sat_n$.

The antenna 22 is capable of receiving the electromagnetic signals $S_r$ corresponding to the signals S transmitted by the satellites $Sat_n$ when they happen to be in a field of visibility.

The control module 30 is capable of controlling the operation of the modules 24, 26 and 28.

The acquisition module 24 is capable of effectively deploying an acquisition phase for acquiring the signals $S_r$ in accordance with techniques known per se.

The continuation module 26 is capable of effectively deploying a continuation phase for continuing the signals $S_r$ using techniques known per se.

Finally, the determination module 28 is capable of effectively deploying a convergence phase, transitory between the acquisition phase and the continuation phase. The convergence phase includes in particular a synchronization determination method 100 for determining a wrong synchronization according to the invention. This method will be described in detail later.

The operation of the receiver 20 will now be explained.

At each start up of the receiver 20, the control module 30 initiates a plurality of channels of acquisition for the entire set of satellites $Sat_n$. Each of these acquisition channels makes it possible to acquire navigation related information originating from the satellite $Sat_n$ with which it is associated, when this satellite $Sat_n$ is in the field of visibility of the antenna 22.

The operation of the receiver 20 on each acquisition channel is substantially analogous. Thus, the operation of the receiver 20 on only one channel will be explained here below.

This channel is associated for example with the satellite $Sat_n$, referred to subsequently as the desired satellite. It is supposed in addition that the satellite $Sat_n$ and located in the region of visibility of the antenna 22.

For this channel, the control module 30 generates a local signal $S_{loc}$ including a local carrier wave $\exp(-j\phi_{ploc})$ and a local spreading code $C_n(\phi_{cloc})$ corresponding to the spreading code $C_n(\phi_c)$ of the desired satellite.

The local signal $S_{loc}$ as a function of time t is then written in the following form:

$$S_{loc}(t) = \exp(-j\phi_{ploc}(t)) \cdot C_n(\phi_{cloc}(t)),$$

with $j^2 = 1$.

Thereafter, the control module 30 launches the execution of the acquisition phase that is then set in motion by the acquisition module 24.

In particular, during the acquisition phase, the acquisition module 24 determines a Doppler value and a value for the time lag of the received signal $S_r$ in comparison to the local signal $S_{loc}$.

The Doppler value corresponds to the frequency offset of the local carrier wave $\exp(-j\phi_{ploc})$ in relation to the carrier wave $\exp(-j\phi_p)$ of the signal $S_r$ received.

The lag value corresponds to the time lag of the spreading code $C_n(\phi_c)$ of the signal $S_r$ as compared to the local spreading code $C_n(\phi_{cloc})$.

These values are determined according to known techniques that include in particular the calculation of correlations of three types.

A first type of correlations, referred to as ad hoc correlations, consists of calculating correlations between the received signal $S_r$ and the local signal $S_{loc}$.

A second type of correlations, referred to as advanced correlations, consists of calculating the correlations between the received signal $S_r$ and a signal corresponding to the local signal $S_{loc}$ in which the local spreading code $C_n(\phi_{cloc}+d)$ is offset in advance of a value d comprised between 0 and $T_{chip}$.

A third type of correlations, referred to as time lagged correlations, consists of calculating the correlations between the received signal $S_r$ and a signal corresponding to the local signal $S_{loc}$ in which the local spreading code $C_n(\phi_{cloc}-d)$ is offset with a time lag of the same value d.

At the end of the acquisition phase, the receiver 20 synchronizes the local signal $S_{loc}$ with the signal S transmitted by the desired satellite $Sat_n$ by using the Doppler and lag values determined.

Then, the control module 30 launches the execution of the phase of convergence and especially the determination method 100 for determining a wrong synchronization. This method is effectively implemented by the determination module 28.

The convergence phase performs a servo-controlled adjustment of the lag value of the local spreading code $C_n(\phi_{cloc})$ and of the Doppler value of the local carrier wave $\exp(-j\phi_{ploc})$, on the received signal $S_r$, with the aid of the code and carrier continuation loops, in particular by making use of the three abovementioned types of correlation.

This transitional phase makes it possible to precisely coincide the local spreading code $C_n(\phi_{cloc})$ and the local carrier wave $\exp(-j\phi_{ploc})$ with the spreading code $C_n(\phi_c)$ and the carrier wave $\exp(-j\phi_p)$ of the satellite signal received $S_r$.

In addition, the determination method 100 that is implemented during this phase provides the ability to determine a wrong synchronization of the corresponding acquisition channel with a satellite $Sat_p$ other than the desired satellite $Sat_n$.

In particular, the determination method 100 provides the ability to possibly determine a wrong non-null Doppler value synchronization by determining the inconsistency between the frequency of the local spreading code $C_n(\phi_{cloc})$ and the frequency of the local carrier wave $\exp(-j\phi_{ploc})$.

If a wrong synchronization is not detected, the determination method 100 provides the ability to determine a wrong non-null Doppler value synchronization by positioning an ad hoc correlator on the tip of the main peak of the autocorrelation function $R_{n,n}$ in the case of a synchronization on the satellite $Sat_n$ desired, and on the tip of a secondary peak of the inter-correlation function $R_{n,p}$ in the contrary case.

In particular, during a wrong synchronization the Doppler and lag values determined by the acquisition module 24, correspond to the signal S transmitted by a satellite $Sat_p$ other than the desired satellite $Sat_n$.

It may then be conceivable that in this case, the signals $S_{loc}$ and S may not be synchronized correctly. It therefore involves a wrong synchronization and a wrong locking-in.

When the determination module 28 determines a wrong synchronization, the control module 30 once again launches the acquisition phase.

When the determination module 28 doesn't determine wrong synchronization, the control module 30 launches the continuation phase which is then effectively implemented by the continuation module 26.

In particular, during the continuation phase, the continuation module 26 regularly updates the Doppler and lag values which enables it to demodulate the received signal $S_r$, and to extract therefrom the corresponding navigation related information element. Then it subsequently transmits this information to the control unit 30.

Finally, the control module 30 consolidates all the information items acquired by all of the acquisition channels and deduces therefrom the position of the receiver 20, its speed, and the timing information.

The determination method for determining a wrong synchronization will now be explained in detail in reference to FIG. 5 showing a flow chart of the steps thereof.

During the initial step 110, the determination module 28 acquires the local signal $S_{loc}$ synchronized with the signal S by the acquisition module 24 during the acquisition phase.

The following steps 115, 120 and 130 are effectively implemented in a parallel manner, during the phase of convergence. The steps 135, 140, 150 and 160 are effectively implemented in a consecutive manner at the end of the convergence phase.

During the step 115, the determination module 28 determines a plurality of correlation intervals.

Each correlation interval is later identified by the index k that varies between 1 and $K_{max}$, $K_{max}$ being the total number of correlation intervals over the duration of the convergence phase.

The correlation intervals have for example substantially the same duration T that is equal for example to 20 ms.

During the step 120, for each correlation interval k, the determination module 28 determines an ad hoc correlator $Z_p(k)$.

In particular, the ad hoc correlator $Z_p(k)$ corresponds to the value of the correlation between the received signal $S_r$ and the local signal $S_{loc}$ in the correlation interval k, this correlation value is determined by the following formula:

$$Z_p(k) = \frac{1}{T}\int_{kT}^{(k+1)T} S_r(t)S_{loc}(t)\,dt.$$

During the step 130, for each correlation interval k, the determination module 28 determines N additional correlators $Z_s(k)$. For example, the number N is greater than or equal to 4.

In the example of embodiment described here below, the number N is equal to 4.

The index s is used to identify each correlator $Z_s(k)$. This index varies between 1 and N.

Each additional correlator $Z_s(k)$ corresponds to the value of the correlation between the received signal $S_r$ and an offset signal $s_d^s$ in the correlation interval k.

The offset signal $S_d$ includes the local carrier wave $\exp(-j\phi_{ploc}(t))$ of the local signal $S_{loc}$ and a spreading code $C_n(\phi_{cloc}(t)-d_s)$ offset with a time lag relative to the spreading code of the local signal by an offset value $d_s$.

In other words, each additional correlator $Z_s(k)$ is determined by the following formula:

$$Z_s(k) = \frac{1}{T}\int_{kT}^{(k+1)T} S_r(t)S_d^s(t)\,dt,$$

where $$S_d^s(t) = \exp(-j\phi_{ploc}(t))\cdot C_n(\phi_{cloc}(t)-d_s).$$

The offset value $d_s$ is chosen by each correlator $Z_s(k)$ as a function of the local spreading code $C_n(\phi_{cloc})$.

In particular, the offset value $d_s$ is chosen in a manner such that the auto-correlation function $R_{n,n}$ of the local spreading code $C_n(\phi_{cloc})$ at the point corresponding to this offset value $d_s$, corresponds to a secondary peak of the said autocorrelation function.

It may then be conceivable that each offset value $d_s$ contains a whole number of chips, that is to say, $d_s = M_s T_{chip}$, where $M_s$ is a whole number.

Figure 6:
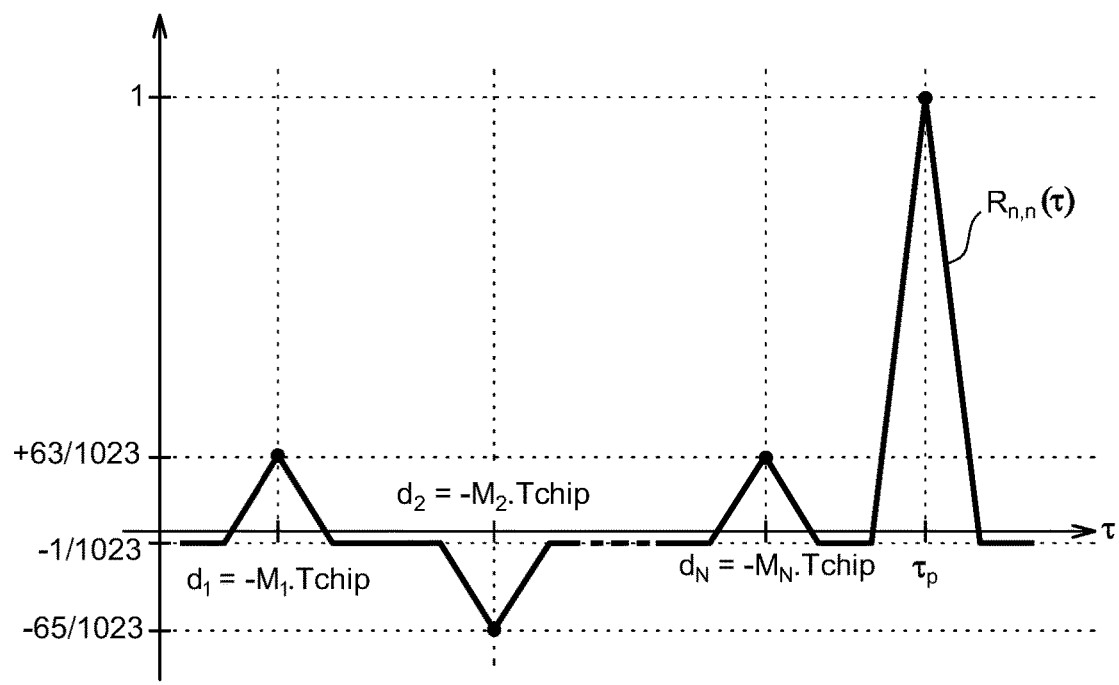
FIG. 6 is a schematic view illustrating one step of the method shown in FIG. 5.

The selection of offset values $d_s$ for different additional correlators $Z_s(k)$ is illustrated in FIG. 6.

Indeed, FIG. 6 shows the autocorrelation function $R_{n,n}$ of the local spreading code $C_n(\phi_{cloc})$. As mentioned earlier, such an autocorrelation function $R_{n,n}$ has a main peak which corresponds to the value of the function $R_{n,n}$ at the point $\tau_p$ in FIG. 6, and a plurality of secondary peaks corresponding to the value of the function $R_{n,n}$ at the points offset from the point $\tau_p$ by a whole number of chips.

Thus, according to FIG. 6, the offset values $d_s$ are chosen in a manner so as to correspond to the secondary peaks of the autocorrelation function $R_{n,n}$.

During the step 135 effectively implemented at the end of the phase of convergence, the determination module 28 determines whether it is a wrong non-null Doppler value synchronization.

In order to do this, the determination module 28 determines a value for the amount of inconsistency $V_{inc}$ between the frequency of the local spreading code $C_n(\phi_{cloc})$ and the frequency of the local carrier $\exp(-j\phi_{ploc})$.

The value of inconsistency $V_{inc}$ is determined by the following expression:

where $$V_{inc} = \left|c\left[\frac{F_{cloc}}{F_{cnom}} - \frac{F_{ploc}}{F_{pnom}}\right]\right|,$$

$F_{cloc}=(\phi_{cloc}(t+\Delta t)-\phi_{cloc}(t))/\Delta t$ is the frequency of the local spreading code;

$F_{ploc}=(\phi_{ploc}(t+\Delta t)-\phi_{ploc}(t))/2\pi/\Delta t$ is the local carrier frequency;

$F_{cnom}$ and $F_{pnom}$ are predetermined nominal values respectively of the frequency of the local spreading code $C_n(\phi_{cloc})$ and the frequency of the local carrier wave $\exp(-j\phi_{ploc})$; and c is the speed of light.

In the exemplary embodiment described, corresponding to the signal GPS L1 C/A, the nominal values $F_{cnom}$ and $F_{pnom}$, are selected as follows:

$$F_{cnom}=1.023\text{ MHz}, F_{pnom}=1575.42\text{ MHz}.$$

Then, the determination module 28 compares the value of inconsistency $V_{inc}$ with a predetermined threshold value of inconsistency.

When the inconsistency value is higher than the threshold value of inconsistency, the determination module 28 determines that it is a wrong non-null Doppler value synchronization. In this case, the control module 30 once again launches the acquisition phase.

In the contrary case, the determination module 28 determines whether it is a wrong null Doppler value synchronization, by means of the following steps.

In particular, during the step 140, the determination module 28 determines an indicator Ind of wrong synchronization as a function of the determined correlators.

In particular, the indicator Ind is defined as a ratio of a detector Det over a reference power $P_{ref}$, that is to say:

$$Ind = \frac{Det}{P_{ref}}.$$

The detector Det is determined as a function of the ad hoc correlators $Z_p(k)$ and the additional correlators $Z_s(k)$ determined over all of the correlation intervals, according to the following expression:

$$Det = \sum_{k=1}^{K_{max}} Re[(P_1 Z_1(k) + P_2 Z_2(k) + \ldots + P_N Z_N(k))\overline{Z_p(k)}],$$

where

Re [X] denotes the real part of a complex number X;

$\overline{X}$ denotes the conjugate of a complex number X; and $P_s$ are the predetermined weighting coefficients, with the index s varying between 1 and N.

The reference power $P_{ref}$ is determined as a function only of the ad hoc correlators $Z_p(k)$ according to the following expression:

$$P_{réf} = \sum_{k=1}^{K_{max}} Re[Z_p(k)\overline{Z_p(k)}] = \sum_{k=1}^{K_{max}} \|Z_p(k)\|^2,$$

where $\|X\|$ denotes a norm of a complex number X.

The weighting coefficients $P_s$ correspond to the theoretical amplitudes of the autocorrelation function $R_{n,n}$ at the points corresponding to the offset values $d_s$.

Thus, each weighting coefficient $P_s$ is chosen from the set $$\left\{\frac{63}{1023}; -\frac{65}{1023}\right\}.$$

During the subsequent step 150, the determination module 28 compares the indicator Ind of wrong synchronization with a low threshold value $E_b$ and high threshold value $E_H$.

In particular, each threshold value is determined previously as a function of the number N of correlators used by the determination module 28.

For this purpose, the Read Only Memory of the receiver 20 is capable of storing a low threshold value $E_B$ and high threshold value $E_H$ that are previously calculated, in relation to the value of N chosen.

The threshold values correspond to the theoretical values of the indicator Ind in the event of a wrong synchronization.

In order to calculate these threshold values, several hypotheses or assumptions on the theoretical values of the correlators $Z_s(k)$ and $Z_p(k)$ in the event of a wrong synchronization are admissible.

Thus, the low threshold value $E_B$ is calculated in the event that each ad hoc correlator $Z_p(k)$ corresponds to a secondary peak and that each additional correlator $Z_s(k)$ corresponds to the value of a constant section.

When N=4, the low threshold value $E_B$ is roughly equal to 0.0039. The value retained for the low threshold value $E_B$ is for example substantially equal to 0.01.

The high threshold value $E_H$ is calculated in the event that each single correlator $Z_p(k)$ corresponds to a secondary peak, that at least some of the additional correlators $Z_s(k)$ correspond to secondary peaks and that at least some of the additional correlators $Z_s(k)$ correspond to the value of a constant section.

When N=4, the high threshold value $E_H$ is substantially equal to 0.0625. The value selected for the high threshold value $E_H$ is for example substantially equal to 0.03.

During the final step 160, the determination module 28 detects a wrong synchronization based on the result of the comparison of the wrong synchronization indicator Ind with the threshold values.

Thus, for example, the determination module 28 determines a wrong synchronization when the wrong synchronization indicator Ind is lower than the low threshold value $E_B$ or higher than the high threshold value $E_H$. In this case, the control module 30 once again launches the acquisition phase.

In the contrary event, the determination module 28 determines that it is not a wrong synchronization and the control module 30 launches the continuation phase.

Hence it may be conceived that the present invention presents a certain number of advantages.

Thus the method according to the invention makes it possible to detect a wrong synchronization very quickly, just after the acquisition phase.

This makes it possible to avoid the need for acquisition of the ephemerides contained in the navigation related information element and to thereby reduce the time for determination of a wrong synchronization.

The use of the method is particularly advantageous during the masking of satellites because the method provides the ability to ensure continuity of service.

Of course, a number of other examples of embodiment of the invention are also possible.

The invention claimed is:

1. A synchronization determination method determining a wrong synchronization of a receiver) with a satellite during an acquisition phase for acquiring a navigation signal originating from this satellite, the satellite being a part of a global satellite-aided positioning system, the signal comprising a navigation related information element that is modulated by a spreading code specific to this satellite and carried by a carrier wave;

during the acquisition phase, the receiver being capable of receiving the navigation signal transmitted by the satellite, of generating a local signal comprising a local carrier wave and a local spreading code, and of synchronizing the local signal with the received signal coming from the satellite in order to demodulate the received signal and of extracting therefrom the navigation related information element during a tracking phase following the acquisition phase;

the method being carried out after the acquisition phase during a convergence phase and comprising the steps of:

in at least one correlation interval, determining an ad hoc correlator value corresponding to the value of correlation between the received signal and the local signal;

in the or each correlation interval, determining N additional correlator values corresponding to the values of correlation between the received signal and an offset signal, each offset signal including the local carrier wave and a spreading code that is offset in relation to the local spreading code by an offset value equal to a whole number of reference units, the number N being a natural number;

determining a value of inconsistency characterizing the inconsistency between the frequency of the local carrier wave and the frequency of the local spreading code, if the value of inconsistency is higher than a predetermined threshold value of inconsistency, determining a wrong synchronization, and in the contrary case:

determining an indicator of wrong synchronization as a function of the correlator values determined;

comparing the indicator of wrong synchronization with at least one threshold value;

determining a wrong synchronization based on the result of the comparison of the indicator of wrong synchronization with the at least one threshold value;

wherein each offset value is selected based on the local spreading code.

2. The method according to claim 1, wherein the reference unit is a chip.

3. The method according to claim 1, wherein the indicator of wrong synchronization is the ratio of a detector value determined as a function of the or each ad hoc correlator value and the additional correlator values, over a reference power determined as a function only of the or each ad hoc correlator value.

4. The method according to claim 3, wherein the determination of the detector value includes the calculation of a weighted sum of the additional correlator values with predetermined weighting coefficients.

5. The method according to claim 4, wherein the weighting coefficients correspond to the amplitudes of the normalized autocorrelation function of the local spreading code, at the points that correspond to the offset values, the normalised autocorrelation function amounting to 1 at a point of reference.

6. The method according to claim 1, wherein the local spreading code is a Gold code.

7. The method according to claim 6, wherein each offset value is chosen to be equal to the value corresponding to a secondary peak of the autocorrelation function of the local spreading code.

8. The method according to claim 6, in which:

during the comparison step, the indicator of wrong synchronization is compared with a low threshold value and with a high threshold value;

during the determination step consisting in determining a wrong synchronization based on the result of the comparison of the indicator of wrong synchronization with the at least one threshold value, a wrong synchronization is determined when the indicator of wrong synchronization is lower than the low threshold value or higher than the high threshold value.

9. The method according to claim 8, wherein, when the number N is equal to four, the low threshold value is roughly equal to 0.01 and the high threshold value is roughly equal to 0.03.

10. The method according to claim 1, wherein the synchronization of the local signal with the received signal comprising the determination of a value of the time lag of the spreading code of the received signal relative to the spreading code of the local signal and of a value of the frequency offset of the carrier wave of the received signal relative to the carrier wave of the local signal.

11. A computer program product comprising software instructions which, when run by a computer equipment unit, carries out a method according to claim 1.

12. A system for determining a wrong synchronization, comprising:

a receiver including an antenna, and a processor for determining a wrong synchronization of the receiver with a satellite during an acquisition phase for acquiring a navigation signal originating from this satellite, the satellite being a part of a global satellite-aided positioning system, the signal comprising a navigation related information element that is modulated by a spreading code specific to this satellite and carried by a carrier wave;

wherein during the acquisition phase, the receiver is capable of receiving the navigation signal transmitted by the satellite, of generating a local signal comprising a local carrier wave and a local spreading code, and of synchronizing the local signal with the received signal coming from the satellite in order to demodulate the received signal and of extracting therefrom the navigation related information element during a tracking phase following the acquisition phase;

wherein in at least one correlation interval, the processor determines an ad hoc correlator value corresponding to the value of correlation between the received signal and the local signal;

wherein in the or each correlation interval, the processor determines N additional correlator values corresponding to the values of correlation between the received signal and an offset signal, each offset signal including the local carrier wave and a spreading code that is offset in relation to the local spreading code by an offset value equal to a whole number of reference units, the number N being a natural number;

wherein the processor determines a value of inconsistency characterizing the inconsistency between the frequency of the local carrier wave and the frequency of the local spreading code, wherein if the value of inconsistency is higher than a predetermined threshold value of inconsistency, the processor determines a wrong synchronization, and wherein in the contrary case, the processor is configured to:

determine an indicator of wrong synchronization as a function of the correlator values determined;

compare the indicator of wrong synchronization with at least one threshold value; and determine a wrong synchronization based on the result of the comparison of the indicator of wrong synchronization with the at least one threshold value; wherein each offset value is selected based on the local spreading code.

* * * * *